(12) United States Patent
Zacharias et al.

(10) Patent No.: US 12,081,407 B2
(45) Date of Patent: Sep. 3, 2024

(54) UPDATING CONFIGURATION SETTINGS OF NETWORK ELEMENTS WHEN A NETWORK IS CHANGED TO A PLANNED TOPOLOGY

(71) Applicant: Ciena Corporation, Hanover, MD (US)

(72) Inventors: Dale Frederick Zacharias, Ottawa (CA); Jitendra Kumar Yadav, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 71 days.

(21) Appl. No.: 17/704,164

(22) Filed: Mar. 25, 2022

(65) Prior Publication Data

US 2023/0254217 A1 Aug. 10, 2023

(30) Foreign Application Priority Data

Feb. 8, 2022 (IN) .............................. 202211006721

(51) Int. Cl.
*H04L 41/12* (2022.01)
*H04L 41/0813* (2022.01)
(52) U.S. Cl.
CPC .......... *H04L 41/12* (2013.01); *H04L 41/0813* (2013.01)
(58) Field of Classification Search
CPC .......................... H04L 41/12; H04L 41/0813
See application file for complete search history.

(56) References Cited

U.S. PATENT DOCUMENTS

| 8,406,121 B2 | 3/2013 | Höf et al. |
| 9,654,346 B2 | 5/2017 | Kumar |
| 10,439,870 B2 * | 10/2019 | Chen ..................... G06F 9/5011 |
| 10,516,760 B2 | 12/2019 | Chugtu et al. |
| 10,979,034 B1 | 4/2021 | Rahul et al. |
| 2008/0273472 A1 | 11/2008 | Bashford et al. |
| 2009/0092391 A1 * | 4/2009 | Zong ..................... H04J 14/021 398/79 |

(Continued)

FOREIGN PATENT DOCUMENTS

WO 2018100437 A1 6/2018

OTHER PUBLICATIONS

May 23, 2023 International Search Report and Written Opinion for International Patent Application No. PCT/US2023/012273.

*Primary Examiner* — Tonia L Dollinger
*Assistant Examiner* — Joseph M Cousins
(74) *Attorney, Agent, or Firm* — Baratta Law PLLC; Lawrence A. Baratta, Jr.

(57) ABSTRACT

Systems and methods are provided for planning a future network topology with associated configuration settings of existing nodes in a network and enacting changes to the configuration settings after the network has been physically changed to the planned future topology. The method can include, in response to receiving a topology plan to change a network from an initial network topology to a future network topology, determine a configuration plan to change configuration settings of one or more existing Network Elements (NEs) deployed in the network in order to transition the network from the initial network topology to the future network topology, and, in response to discovering that the network has been physically changed to match the future network topology, automatically enact the configuration plan to change the configuration settings of the one or more existing NEs.

19 Claims, 4 Drawing Sheets

(56) References Cited

U.S. PATENT DOCUMENTS

| | | |
|---|---|---|
| 2014/0226525 A1 | 8/2014 | Eastlake, III et al. |
| 2018/0183753 A1* | 6/2018 | Vemulakonda ....... H04L 61/103 |
| 2018/0220211 A1* | 8/2018 | Hann ................. H04Q 11/0421 |
| 2021/0051549 A1* | 2/2021 | Akl ....................... H04W 48/20 |
| 2021/0067380 A1* | 3/2021 | Hegde ................. H04L 41/0886 |
| 2021/0168125 A1* | 6/2021 | Vemulpali ............. H04L 9/0825 |
| 2022/0210664 A1* | 6/2022 | Bollapragada ........ H04W 24/02 |
| 2022/0311733 A1* | 9/2022 | Kawada .............. H04L 12/4641 |

\* cited by examiner

UPDATING CONFIGURATION SETTINGS OF NETWORK ELEMENTS WHEN A NETWORK IS CHANGED TO A PLANNED TOPOLOGY

TECHNICAL FIELD

The present disclosure generally relates to networking systems and methods. More particularly, the present disclosure relates to determining and applying changes to the configuration settings of network elements deployed in a network in response to discovering that the topology of the network matches a planned future topology.

BACKGROUND

Most communications networks are often changed, as needed, to meet the service requirements of customers. For instance, based on an analysis of network operational parameters, it is possible to determine if the network should be physically changed (e.g., by adding one or more nodes) in order to meet current demand and/or anticipated demand in the future. After physical changes are made to a network, a network operator (e.g., at a central office or data center) will implement configuration changes to the new and previously-existing nodes. Usually, these configuration changes are applied in a manual data-entry process, which can be time-consuming and prone to human error. In addition, during the transition from an old topology to a new topology, a network will typically perform poorly, particularly when the configuration settings are not updated in a timely fashion.

Field technicians are usually responsible for physically adding or removing nodes, installing new fiber links between nodes, adding amplifiers, etc. Oftentimes, however, the coordination between the physical actions (by the field technicians) and the management actions of applying new configuration settings (by the network operators) can be complex and can result in unnecessary network downtime. Thus, if the communication between the field technicians and the network operators is less than ideal, then it stands to reason that the network will lack a smooth transition from an old topology to a new topology.

In addition to the issue of involvement or communication between field technicians and network operators, another shortcoming of conventional network-transition techniques is that the transition often takes more time than expected. As such, faults may be raised more frequently during the transition stage, which can add to network downtime and extend the complexity and timely actions of network operators for hustling to get the network back up and running. This, of course, can also add stress to network operators who may need to act quickly upon the completion of the physical network changes. With limited time and more fault notifications to deal, network operators under stress may follow incorrect procedures, create new faults, and/or cause other situations where the network might be forced to operate in a less than optimal manner, all of which can add to the network downtime and operator stress. Therefore, there is a need in the field of network planning to overcome these known problems with conventional strategies.

BRIEF SUMMARY

The present disclosure is directed to systems and methods for pre-planning changes to a network and computing configuration changes of existing Network Elements (NEs) of the network needed to allow the future planned network to operate properly. Also, the systems and methods are configured to determine when a current topology of the network matches the planned future network topology. When there is a match, the systems and methods are configured to automatically enact the changes to the configuration settings of the NEs without user intervention. This allows a network operator to plan a network change (along with planned configuration changes of associated components) and the automatic changing of configuration settings when the current topology matches the future planned topology of the network.

For example, in response to receiving a topology plan to change a network from an initial network topology to a future network topology, a method may include the step of determining a configuration plan to change configuration settings of one or more existing NEs deployed in the network in order to transition the network from the initial network topology to the future network topology. In response to discovering that the network has been physically changed to match the future network topology, the method may include the step of automatically enacting the configuration plan to change the configuration settings of the one or more existing NEs.

According to some embodiments, the future network topology may include one or more new NEs. The method may include determining configuration settings for each of the one or more new NEs. The step of determining the configuration settings for each of the one or more new NEs, according to some implementations, may include using Zero Touch Provisioning (ZTP) for a network element to determine its configuration settings.

The method may also include steps of discovering a current network topology of the network, calculating a delta between the current network topology and the future network topology, and determining whether the current network topology matches the future network topology. The method may also include suppressing one or more alarms or notifications from being provided by an Alarm Reporting Control (ARC) when the current network topology is an intermediate topology between the initial network topology and the future network topology. The method may also include determining whether the network runs error-free when in the current network topology and then suppressing the one or more alarms or notifications for a predetermined time period while the network runs error-free. Furthermore, the method may include the step of repeating the discovering and calculating steps until the current network topology matches the future network topology. The method may also include the step of determining configuration updates for changing the configuration settings of the one or more existing NEs in order to convert the network from the current network topology to the future network topology. In addition, the calculated delta may represent actions as a result of adding or removing a photonic node, an NE, an amplifier, a fiber, a fiber optic link, and a Dynamic Circuit Network (DCN) of a central office.

Furthermore, the method may include loading the determined configuration plan in memory and retrieving the configuration plan from the memory for automatically enacting the configuration plan. Subsequent to automatically enacting the configuration plan, the method may also include the step of resetting the future network topology as the initial network topology. Also, the step of discovering the network topology may include a link layer discovery protocol.

Also, the step of receiving the topology plan may include enabling a user of the network controller to submit the topology plan. The method may be performed by a network controller, where, in some embodiments, the network controller may be incorporated in one or more of a Network Management System (NMS), an Element Management System (EMS), a Software-Defined Networking (SDN) controller, a network orchestrator, and a planning/configuring system.

The step of changing the configuration settings, in some embodiments, may include one or more network actions selected from the group consisting of: a) modifying an amplification power of one or more amplifiers, b) enabling one or more ports or interfaces, c) disabling one or more ports of interfaces, d) reconfiguring one or more routers or switches, e) enabling or disabling a relay agent of at least one of the one or more NEs, f) enabling an Alarm Reporting Control (ARC) of one or more ports or interfaces, g) modifying a Reconfigurable Optical Add/Drop Multiplexer (ROADM) of one or more NEs, h) modifying cost metrics of one or more routes between adjacent NEs, among other actions. In some implementations, the network actions may be enacted in accordance with a predetermined sequence.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
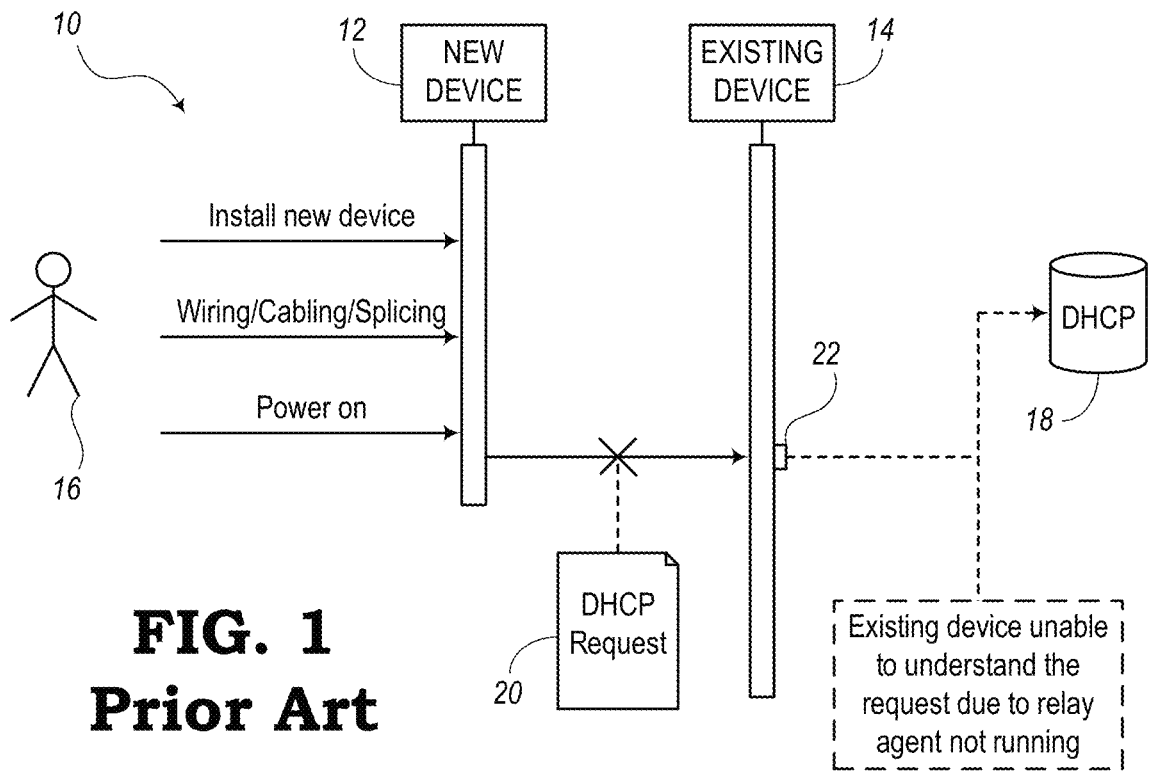
FIG. 1 is a diagram illustrating a first example of a problem that may arise in response to a new node being added to a network, according to various embodiments.

The present disclosure relates to systems and methods for overcoming the issues that are common in conventional methodologies for transitioning a network from a first topology to a planned future topology. Usually, conventional systems have two separate stages, where the first stage is a planning stage and the second stage includes setting of configuration parameters of Network Elements (NEs) in a network. However, the systems and methods of the present disclosure are configured to combine these two stages into one, whereby a pre-planned configuration strategy can be implemented automatically in response to detecting that a network matches a planned topology.

The embodiments of the present disclosure automate the configuration changes on the NEs as field technicians make the physical network changes. The present disclosure may be configured to cover both photonic network changes (e.g., node insertion in a photonic network) as well as Dynamic Circuit Network (DCN) topology changes which may occur within central offices as the number of nodes within a central office changes. Historically, a network change normally requires manually making the configuration changes on the NEs as the physical network changes are being made. The manual network configuration change might be made by network operators (e.g., network administrators, IT personnel, users, technicians, central office managers, etc.), who may be located in a Network Operations Center (NOC), central office, data center, or the like. This manual configuration change can be made in coordination with the physical network changes being made by a field technician. The embodiments of the present disclosure are configured to simplify the coordination of the network changes by automatically applying the configuration changes to deployed nodes as the field technician makes the physical network changes.

The present disclosure may include a set of algorithms executing on a network management controller, which may be configured to compute and apply the device configuration changes that are required on a deployed node to transition it to the planned topology. The configuration changes are computed by analyzing the delta between the discovered present-state nodal configuration and the future nodal configuration required to realize the future planned network topology. The future nodal configuration is built both for nodes which already exist in the network and nodes which are to be newly added in the future topology. Configuration changes on the deployed network are automatically initiated by the network controller when it sees a change in topology (e.g., from the perspective of a deployed node) which aligns with the future planned topology.

The present disclosure is configured, in some embodiments, to work in conjunction with Zero Touch Provisioning (ZTP) for new nodes. For example, ZTP may refer to a technique for automatically setting up a newly added device to configure this device for operation in a network. However, ZTP usually only refers to "new" devices and does not include modifying the configuration settings of devices (e.g., NEs) that already exist in the network before any network topology change. As ZTP may be used to quickly configure a device that is deployed in a network, the systems and methods of the present disclosure are configured to determine configuration updates for "existing" devices (e.g., nodes, NEs, switches, routers, fibers, amplifiers, etc.). The embodiments of the present disclosure may be configured for auto-configuring existing device, and, according to some additional implementations, utilizing ZTP for configuring new devices. Both of these techniques may simplify the tasks of network operators by allowing pre-planning of new configuration changes and automatically initiating these new configuration changes without manual intervention when it is determined that the network has been physically changed to coincide with a planned future network topology. By pre-planning the configuration changes, a newly modified network can be quickly converted to the updated configuration settings without the worry of user error, extended network downtime, etc.

The automatic configuration updating described in the present disclosure (along with the optional ZTP processing) can provide a holistic solution for deploying new nodes in a network when the new nodes require configuration changes on existing nodes (e.g., adjacent nodes). New nodes in the network can have their configuration applied using ZTP and configuration changes to existing nodes can have their configurations modified automatically using the systems and methods of the present disclosure.

The present disclosure also provides for the configuration of a future realization scheme, which may include multiple subsequent stages. Each stage may be defined by specific dates and times when the configuration changes are to be applied to the existing nodes. The dates and times of each of the stages of the future realization scheme allow ports and/or interfaces of the diverse NEs to be transitioned to an enabled state (e.g., to enable the detection of topology changes). Once an interface is in an enabled state, the remainder of its configuration changes will be initiated by the detection of topology changes which align to the future planned topology. To prevent enabled interfaces from providing a standing alarms, reports, traps, notifications, etc., an Alarm Reporting Control (ARC), as defined in ITU M.3100, can be supported. ARC may not be defined in Management Information Bases (MIBs) for managing data ports.

The present disclosure may be configured in a network controller, or other suitable control device, for identifying a network change (e.g., topology change), determining whether the changed network matches the planned network topology, and then applying the configuration settings of the nodes or NEs for the planned network. The network controller may be configured with the ability to maintain both a planned stage scheme and a discovery scheme, which normally might work independently, but may be combined in the present disclosure to mix planning of a new topology with the configuration processes for changing config settings when the topology matches a future planned topology.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 shows a first example of a portion of a network 10, where a problem may arise in response to a new device 12 (e.g., node) being added to the network 10. Also, the network 10 already includes an existing (i.e., previously deployed) device 14. A user 16 (e.g., technician) may be configured to install the new device 12 in the network 14. Also, the user 16 is configured to perform wiring, cabling, splicing actions to connect the new device 12 to other elements (e.g., fibers) in the network 14, and then power on the new device 12.

In some embodiments, the network 10 may be considered to include a communication failure in a network augmentation (e.g., new device 12). The changes may be visible on Day 2. The embodiments of the present disclosure are configured to provide a solution to a problem where reconfiguration is required when the reconfiguration results in a network topology change. As shown in FIG. 1, the user 16 installs the new device 12 (e.g., network augment) into the deployed network 10 and powers on the new device 12 after wiring, cabling, fibering, etc.

The new device 12 may be configured, in some embodiments, to start negotiating with a DHCP server 18. The new device 12 intends to send a DHCP request 20 (e.g., initial handshaking request) via a relay agent 22 of the existing device 14. However, since the relay agent 22 of the existing device 14 may not be running in the initial state of the existing device 14, the existing device 14 will not understand the DHCP request 20. In this case, the user 16, at this point, will be required to configure the relay agent 22 on the existing device 14 to start provisioning of this augment. However, as mentioned above, the requirement to perform manual configuration changes after the deployment of the new device 12 (i.e., as required by the conventional techniques) may be time-consuming and error prone. Instead of operating according to the conventional processes, the systems and methods of the present disclosure are configured to determine the need to enable the relay agent 22 ahead of time and load this configuration change in memory. Then, when it is determined that the new device 12 has been deployed in the network 10, the configuration change can be retrieved from memory and automatically enacted to shorten the delay between deployment of the new device 12 and the change to the configuration settings of the relay agent 22 (e.g., turning on the relay agent 22).

Figure 2:
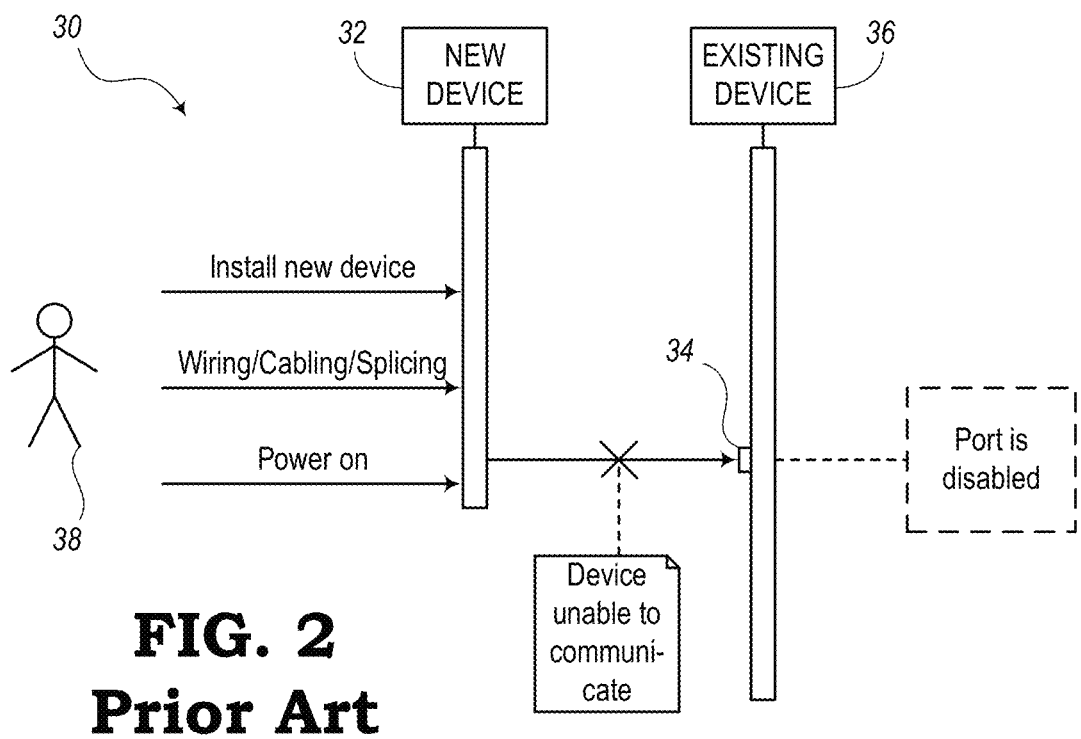
FIG. 2 is a diagram illustrating a second example of a problem that may arise in response to a new node being added to a network, according to various embodiments.

FIG. 2 shows another example of a network 30 and a problem that may arise in response to a new node 32 being added to the network 30. In this embodiment, the new node 32 may be provisioned when a port 34 of an existing (e.g., already deployed) node 36 is disabled, which would prevent communication between the new node 32 and the existing node 36. If the new augment (e.g., new node 32) is connected when the port 34 is disabled, the user (e.g., network operator, network administrator, etc.) may then be required, after deployment of the new node 32, to start its provisioning by manually enabling the port 34 on the existing node 36 first. A technician who installs the new node 32 will need to inform the user 38 that the new augment is installed, and then the user 38 will need to start manual configuration changes on the new node 32.

Again, according to conventional techniques, this manual process may be time-consuming and error-prone. To automate the process, the systems and methods of the present disclosure may be configured to derive configuration changes plans ahead of time, whereby, when the network topology is changed to match a future planned topology (e.g., the network 30 with the new node 32 installed) and this match is detected, then the systems may automatically enact the pre-planned configuration changes, such as, in this example, enabling the port 34 to allow communication between the new node 32 and the existing node 36.

Figure 3:
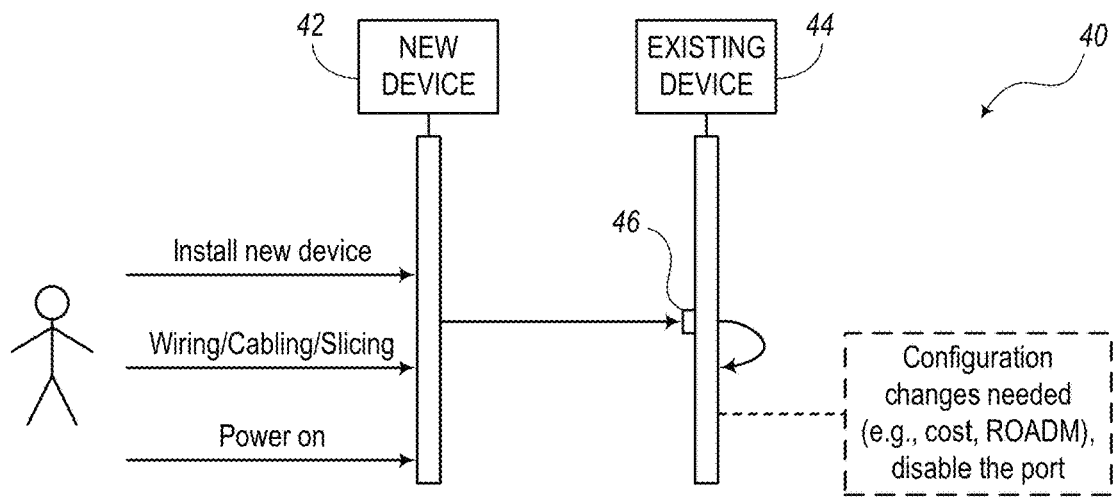
FIG. 3 is a diagram illustrating an example of actions that may be needed when a new node is added to a network, according to various embodiments.

FIG. 3 is a diagram illustrating another example of actions that may be needed in a network 40 when a new node 42 is provisioned. As described above, the network 40 may need configuration changes on an existing node 44 that is already deployed in the network 40. When a new augment (e.g., new node 42) is being provisioned, it may be required that configuration settings of the existing node 44 are changed.

In this case, the require configuration changes may include disabling the port 46, modifying a Reconfigurable Optical Add/Drop Multiplexer (ROADM) at the remote (far end) existing node 44, changing routing costs as needed, etc. Again, the deficiencies of the conventional systems that require manual configuration changes after the physical deployment can be overcome by the systems and methods of the present disclosure by pre-calculating the configuration changes that would be needed with a new topology (e.g., addition of the new node 42) and implementing these configuration changes after it is determined that the network 40 has indeed been changed to match the topology of the planned future network topology.

Thus, with respect to FIG. 1-3, the systems and methods of the present disclosure are configured to solve these problems or any other problems where reconfigurations of existing, deployed devices are required in order to provision the new augment into the network. A planning stage may have complete knowledge of the initial topology of the deployed network. That is, the planning stage, first of all, may be configured to discover the deployed network information. After that, one or more new devices may be planned for insertion (or deletion) and a control device (e.g., network controller) may be configured to load (or store) the details (e.g., future planned topology, DCN data information, site name information etc.). When the new augment is physically installed in the field (as planned) and as soon as this topology change is detected in the network controller to realize that the topology now matched the planned topology, the network controller is configured to execute the changes to the configuration settings on the deployed devices (e.g., existing devices/nodes 14, 36, 44). The configuration changes may include enabling the ports or interfaces on the deployed devices as needed and enabling relay agents as needed.

In addition to this, the automated configuration changes may be implemented in subsequent stages as needed to provide a smooth transition from the initial topology to the planned topology. For example, the network controller may be configured to enable an Alarm Reporting Control (ARC) (e.g., defined in accordance with ITU M.3100) on these ports or interfaces, as needed. After a new device is provisioned, the network controller may be configured to compare the changes to determine any differences between a discovered topology and a planned topology. It then applies the post configuration changes on the devices (e.g., disabling unused ports, etc.) as needed.

Figure 4:
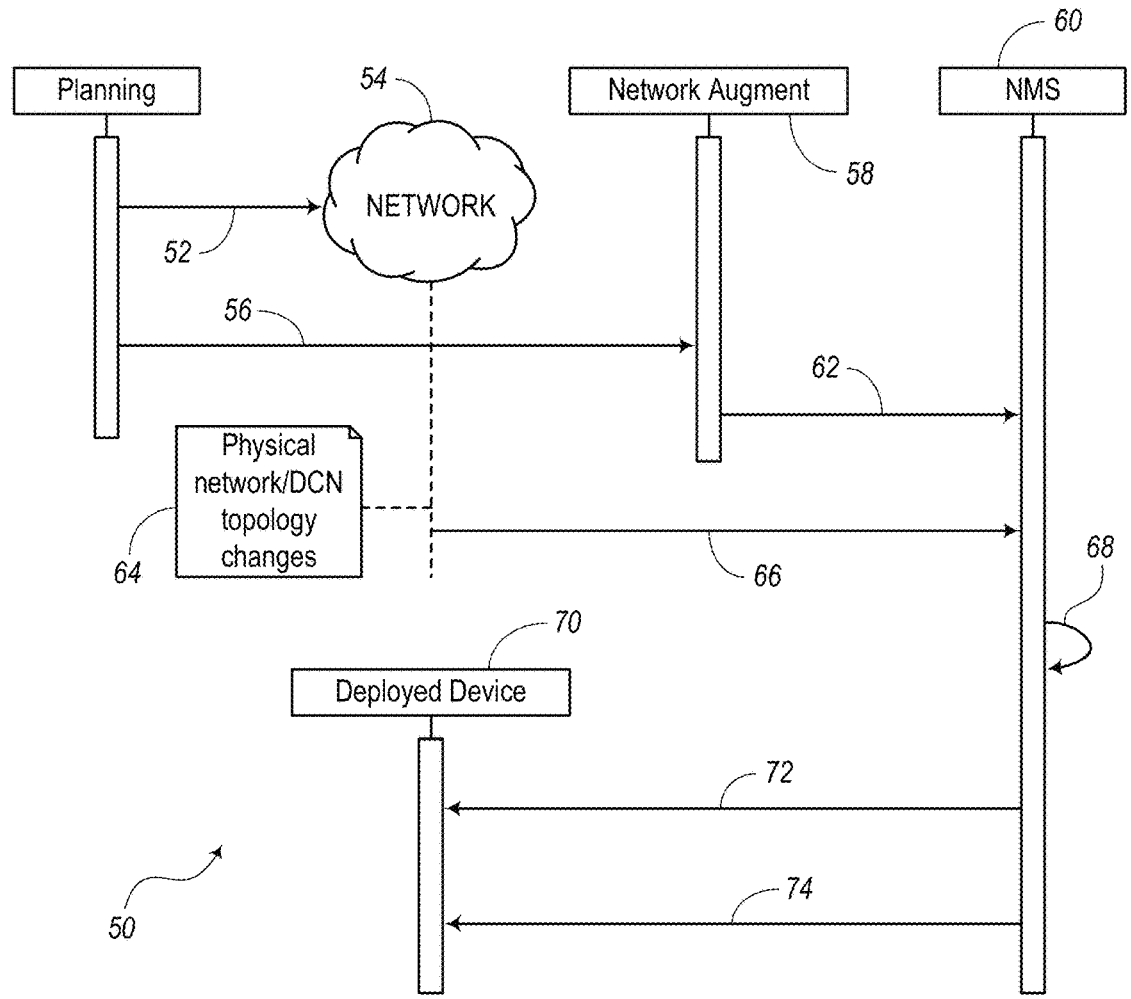
FIG. 4 is a diagram illustrating a system that includes a network planning stage and a network configuration stage, according to various embodiments.

FIG. 4 is a diagram illustrating a system 50 that includes a network planning stage and a network configuration stage for transitioning a network based on newly added NEs and other changes. The system 50 includes a process of discovering the components (e.g., nodes, NEs, fibers, amplifiers, etc.) of a network 54 that has already been deployed. For example, the network 54 may represent any of the networks 10, 30, 40 described above. The system 50 further includes a process of planning 56 a planned new device 58 that is to be installed in the network 54. The planned new device 58 may be a new photonic fiber line, a new degree of an existing node, etc.

A Network Management System (NMS) 60 (or other suitable controller) may be configured to obtain 62 network augment information (i.e., information of the planned new device 58), which can be loaded into memory or a database. Also, data 64 regarding changes to the physical network 54 or DCN topology is obtained from the network 54 and loaded 66 in the NMS 60. The NMS 60 is configured to determine the current topology and compare 68 this with a planned topology.

The planned new device 58 is physically deployed in the network 54 and thereby regarded as a deployed device 70. The NMS 60 is configured to determine at this time that the planned future topology of the network 54 has been realized such that the current topology matches the planned future topology. In response to comparing 68 and determining a match with the planned future topology, the NMS 60 may be configured to apply 72 the planned configuration changes to components of the network 54, and, in some embodiments, may be configured to apply 72 the planned configuration setting for the deployed device 70. Also, in some embodiments, the NMS 60 may be configured to perform an audit process 74 on the deployed device 70 of the network 54.

Figure 5:
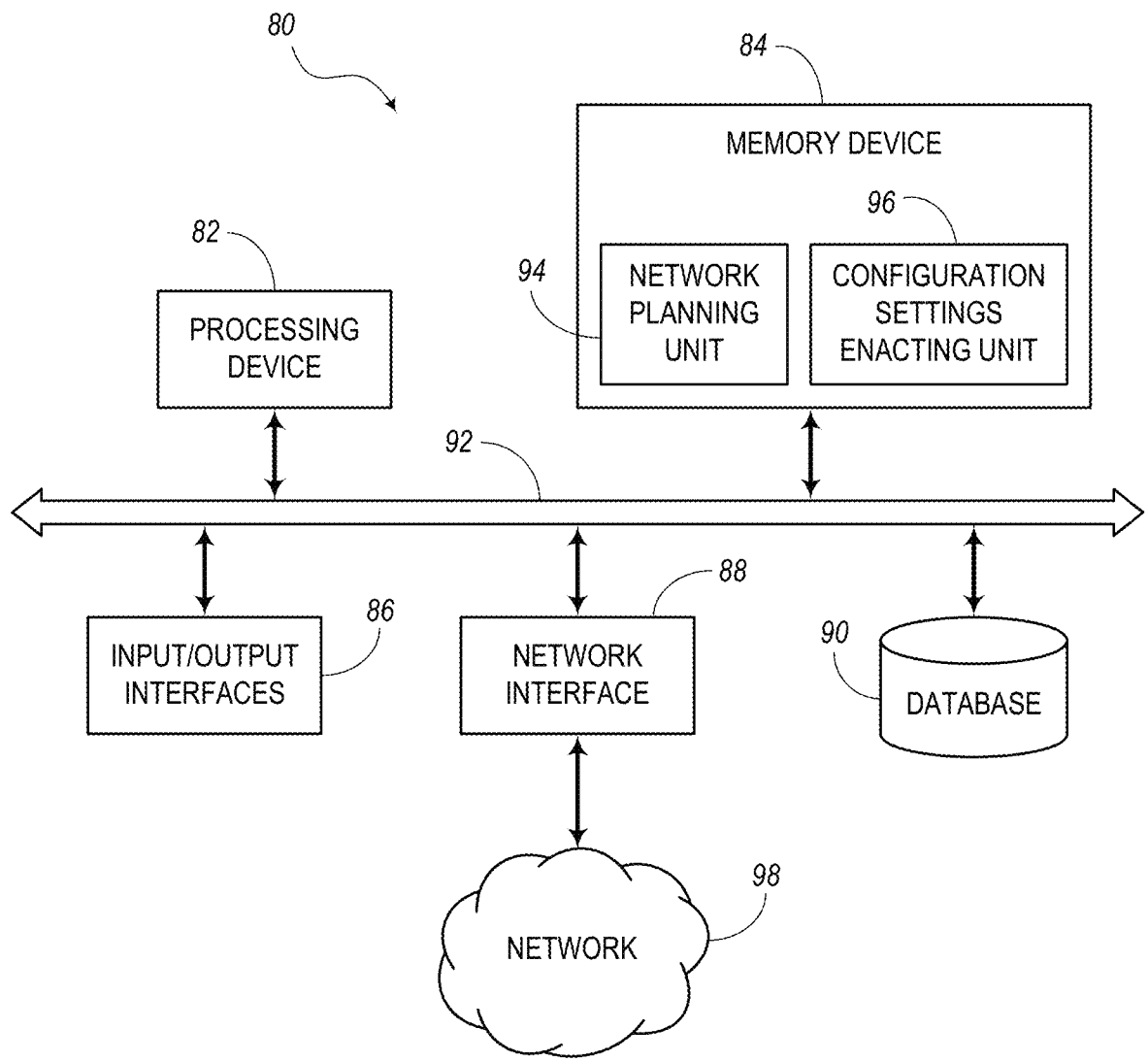
FIG. 5 is a block diagram illustrating a network controller for enabling network planning and the enaction of configuration settings, according to various embodiments of the present disclosure.

FIG. 5 is a block diagram illustrating an embodiment of a network controller 80 for enabling network planning and automatically enacting configuration settings. The planning an automatic enaction of configuration settings may be performed on a related network 98 (e.g., network 10, 30, 40, 54). In the illustrated embodiment, the network controller 80 may be a digital computing device that generally includes a processing device 82, a memory device 84, Input/Output (I/O) interfaces 86, a network interface 88, and a database 90. It should be appreciated that FIG. 5 depicts the network controller 80 in a simplified manner, where some embodiments may include additional components and suitably configured processing logic to support known or conventional operating features. The components (i.e., 82, 84, 86, 88, 90) may be communicatively coupled via a local interface 92. The local interface 92 may include, for example, one or more buses or other wired or wireless connections. The local interface 92 may also include controllers, buffers, caches, drivers, repeaters, receivers, among other elements, to enable communication. Further, the local interface 92 may include address, control, and/or data connections to enable appropriate communications among the components 82, 84, 86, 88, 90.

It should be appreciated that the processing device 82, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 82 may also include or utilize stored program instructions (e.g., stored in hardware, software, and/or firmware) for control of the network controller 80 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 84 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 84 may incorporate electronic, magnetic, optical, and/or other types of storage media. The memory device 84 may have a distributed architecture, where various components are situated remotely from one another, but can be accessed by the processing device 82.

The memory device 84 may include a data store, database (e.g., database 90), or the like, for storing data. In one example, the data store may be located internal to the network controller 80 and may include, for example, an internal hard drive connected to the local interface 92 in the network controller 80. Additionally, in another embodiment, the data store may be located external to the network controller 80 and may include, for example, an external hard drive connected to the Input/Output (I/O) interfaces 86 (e.g., SCSI or USB connection). In a further embodiment, the data store may be connected to the network controller 80 through a network and may include, for example, a network attached file server.

Software stored in the memory device 84 may include one or more programs, each of which may include an ordered listing of executable instructions for implementing logical functions. The software in the memory device 84 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 82), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 82 or other suitable circuitry or logic). For example, when executed, the instructions may cause or enable the processing device 82 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 82), or any suitable combination thereof. Software/firmware modules may reside in the memory device 84, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 86 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 86 may include, for example, one or more of a serial port, a parallel port, a Small Computer System Interface (SCSI), an Internet SCSI (ISCSI), an Advanced Technology Attachment (ATA), a Serial ATA (SATA), a fiber channel, InfiniBand, a Peripheral Component Interconnect (PCI), a PCI extended interface (PCI-X), a PCI Express interface (PCIe), an InfraRed (IR) interface, a Radio Frequency (RF) interface, and a Universal Serial Bus (USB) interface.

The network interface 88 may be used to enable the network controller 80 to communicate over a network, such as the network 98, the Internet, a Wide Area Network (WAN), a Local Area Network (LAN), and the like. The network interface 88 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 88 may include address, control, and/or data connections to enable appropriate communications on the network 98.

The network controller 80 further includes a network planning unit 94 and a configuration settings enacting unit 96. The units 94, 96 (or sub-applications) may be implemented in software and/or firmware and stored in a non-transitory computer-readable medium, such as the memory device 84. In other embodiments, the units 94, 96 may be implemented in hardware and configured in the processing device 82. According to other embodiments, the units 94, 96 may be implemented in any suitable combination of hardware, software, firmware, etc. The units 94, 96 may include computer logic and/or instructions for enabling or causing the processing device 82 to perform various steps of processes for planning network changes and automatically enacting these changes once it is determined that the network 98 has been physically modified to match a pre-planned network topology.

According to some embodiments of the present disclosure, the network controller 80 may be configured to compute the network configuration changes required to transition a node of the network 98 to the planned configuration. The network controller 80 can subsequently audit the discovered configuration against a planned configuration. The network controller 80 may be configured to automatically apply the configuration changes as changes in the network topology are discovered. It may be noted that no human decision input is required in either the step of determining the configuration changes to be applied or the step of applying the changes.

The network planning unit 94 may be configured to allow a user (e.g., network operator) to create a new topology for the existing network 98. Then, the network planning unit 94 is configured to load the obtained future planned topology into the memory device 84 or database 90. The network planning unit 94 is also configured to perform any suitable discovery processes (e.g., link layer discovery) for determining the current topology of the network 98. Also, the network planning unit 94 can compare the current topology with the future planned topology to determine when they match, such as when one or more field technicians have physically made the planned changes to the network 98.

The configuration settings enacting unit 96 is configured to work in cooperation with the network planning unit 94. The configuration settings enacting unit 96 is configured to obtain the configuration changes that may be needed for modifying the configuration settings of one or more components in the network 98 when the network 98 is physically altered to match the future planned topology. These planned configuration changes may be loaded in the memory device 84 or database 90 to make planned configuration changes to existing nodes of the network 98 when appropriate. Upon determining a match between the current topology and the future planned topology (e.g., by either the network planning unit 94 or configuration settings enacting unit 96), the configuration settings enacting unit 96 is configured to enact the configuration changes to set the values of the configurations as appropriate for proper operation of the network 98 in its planned topology.

The network planning unit 94 may be a sub-application in the network controller 80 and may be configured to load the discovered deployed network topologies. The network planning unit 94 loads this information directly or indirectly from the network controller 80. When a new network augment is planned on the deployed network 98, the network planning unit 94 is configured to consider future planned network topologies. Again, the network planning unit 94 may be configured to help the network controller 80 save all the information related to changes into the discovered topology and the future planned topology. The network planning unit 94 may also be configured to compute the network configuration changes required to transition one or more nodes from the deployed configuration to the future planned configuration.

The network controller 80 may be configured to compute data regarding the configuration changes. For example, the network controller 80 may be configured to consider the interfaces that need to be enabled before an augment (e.g., new device) is connected to it. The network controller 80 may be configured to consider one or more relay agents on a given interface, may consider the cost associated with the new deployment, etc. The network controller 80 is also configured to consider the ROADM of one or more remote (far-end) nodes, consider SiteName information, etc. In addition, configuration settings enacting unit 96 of the network controller 80 may be configured to compute the configuration of a "future realization scheme," which may include date and time information. The future realization scheme may define the dates and times (or other suitable scheduling information) for enacting changes to be applied to existing nodes of the network 98. The realization date and time information can be used to allow ports or interfaces of nodes to be switched to an enabled state. Admin State and Operational State parameters may be used to update these port/interface states.

According to some embodiments, the network controller 80 may be configured to support Alarm Reporting Control (ARC) on Ethernet interfaces. ARC might not necessarily be defined in standards typically used for managing data interfaces. However, the present disclosure provides embodiments whereby the network controller 80 (or other suitable systems or methods) can autonomously apply the configuration changes on discovery of network topology changes. Thus, when a field technician installs a new network augment and updates the hardware changes, the topology change can act as a trigger in the network 98 and is informed by any means to the network controller 80. The network controller 80 is then configured to autonomously apply the configuration changes for the one or more devices, as needed for proper network operation.

The network controller 80 may also be configured to audit the topology and apply post configuration changes after the network augment is provisioned. The audit may be part of a cleanup activity and may be started immediately after the new configuration changes are enacted. When a new network augment is successfully provisioned into the network, or when a currently discovered topology matches the future planned topology as computes by the network controller 80, another sub-application may be executed to initiate the audit for deployed devices in the network. This method may be configured to apply the post configuration changes onto the network devices. As part of this task, the network controller 80 may further be configured to disable all the active ports which are not in use for a device. This successfully completes the reconfiguration of the deployed devices into the network due to a new network augment.

Figure 6:
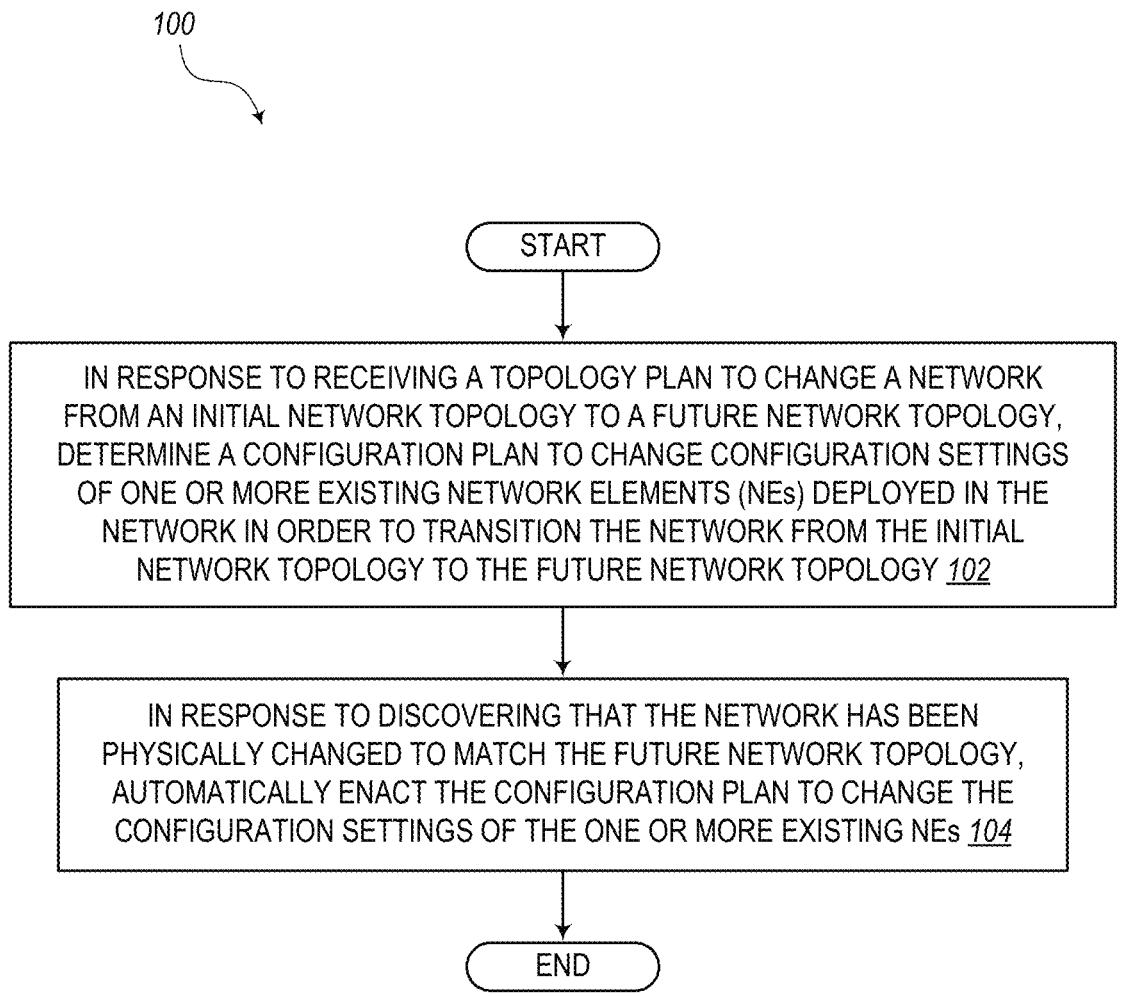
FIG. 6 is a flow diagram illustrating a process for enabling network planning and the enaction of configuration settings, according to various embodiments of the present disclosure.

FIG. 6 is a flow diagram showing an embodiment of a process 100 for allowing a network operator to plan a network change (along with planned configuration changes of associated components) and the automatic changing of configuration settings when the current topology matches the future planned topology of the network. For example, in response to receiving a topology plan to change a network from an initial network topology to a future network topology, the process 100 may include the step of determining a configuration plan to change configuration settings of one or more existing Network Elements (NEs) deployed in the network in order to transition the network from the initial network topology to the future network topology, as indicated in block 102. In response to discovering that the network has been physically changed to match the future network topology, the process 100 further includes the step of automatically enacting the configuration plan to change the configuration settings of the one or more existing NEs, as indicated in block 104.

According to some embodiments, the future network topology may include one or more new NEs, whereby the process 100 may include determining configuration settings for each of the one or more new NEs. The step of determining the configuration settings for each of the one or more new NEs, according to some implementations, may include using Zero Touch Provisioning (ZTP) for a network element to determine its configuration settings.

The process 100 may also include steps of discovering a current network topology of the network, calculating a delta between the current network topology and the future network topology, and determining whether the current network topology matches the future network topology. The process 100 may also include suppressing one or more alarms or notifications from being provided by an Alarm Reporting Control (ARC) when the current network topology is an intermediate topology between the initial network topology and the future network topology. The process 100 may also include determining whether the network runs error-free when in the current network topology and then suppressing the one or more alarms or notifications for a predetermined time period while the network runs error-free. Furthermore, the process 100 may include the step of repeating the discovering and calculating steps until the current network topology matches the future network topology. The process 100 may also include the step of determining configuration updates for changing the configuration settings of the one or more existing NEs in order to convert the network from the current network topology to the future network topology. In addition, the calculated delta may represent actions as a result of adding or removing a photonic node, an NE, an amplifier, a fiber, a fiber optic link, and a Dynamic Circuit Network (DCN) of a central office.

Furthermore, the process 100 may include loading the determined configuration plan in memory and retrieving the configuration plan from the memory for automatically enacting the configuration plan. Subsequent to automatically enacting the configuration plan, the process 100 may also include the step of resetting the future network topology as the initial network topology. Also, the step of discovering the network topology may include a link layer discovery protocol.

Also, the step of receiving the topology plan may include enabling a user of the network controller to submit the topology plan. The process 100 may be performed by a network controller (e.g., network controller 80), where, in some embodiments, the network controller may be incorporated in one or more of a Network Management System (NMS), an Element Management System (EMS), a Software-Defined Networking (SDN) controller, a network orchestrator, and a planning/configuring system.

The step of changing the configuration settings, in some embodiments, may include one or more network actions selected from the group consisting of: a) modifying an amplification power of one or more amplifiers, b) enabling one or more ports or interfaces, c) disabling one or more ports of interfaces, d) reconfiguring one or more routers or switches, e) enabling or disabling a relay agent of at least one of the one or more NEs, f) enabling an Alarm Reporting Control (ARC) of one or more ports or interfaces, g) modifying a Reconfigurable Optical Add/Drop Multiplexer (ROADM) of one or more NEs, h) modifying cost metrics of one or more routes between adjacent NEs, among other actions. In some implementations, the network actions may be enacted in accordance with a predetermined sequence.

Other processes may be implemented by the network controller 80 and/or various computer programs (e.g., network planning unit 94, configuration settings enacting unit 96, etc.) according to the different embodiments of the present disclosure. In one embodiment, systems and methods may be divided into multiple stages, including, for example, 1) planning, 2) discovery, and 3) enacting configuration changes (or reconfiguration stage).

The planning stage may include a) receiving or obtaining a topology plan (from a network operator) to change a network from an initial network topology to a future network topology, b) determining configuration settings needed for the future topology (includes previous existing and new elements), and/or other steps.

The discovery stage may include a) discover/detect a current state of an existing network and configuration settings thereof, where the existing network has a plurality of existing NEs (e.g., existing network has an initial topology), b) calculating a delta between the current topology and the future topology, c) based on the delta, calculating configuration changes (or config updates) for the existing NEs for converting the network from the current topology to the future topology, d) storing/loading the calculated configuration changes in memory or a database, and/or other steps.

The enacting configuration changes (reconfiguration) stage may include a) determining when the network has been physically changed (e.g., by field technicians) to match the planned future topology (this step may be repeated until the network matches), b) upon determining a match, retrieving the calculated configuration changes from the memory (or database) and automatically change the configuration settings of the originally existing NEs (e.g., apply config changes) to transition the network to planned future topology/configurations, c) perform ZTP on any new NEs added to the network (optional), d) setting the new topology as the current topology and return to the planning to await further planning instructions, and/or other steps.

According to some embodiments, a link layer discovery protocol may be used to discover the topology. The ARC may be suppressed (in response to being moved to an enabled state) from having a standing alarm report (or sending trap notifications or other messages). The processes may be executed using a network controller, network management controller, NMS, SDN controller, EMS, orchestrator, planning/configuring system, etc.

Also, for a certain time when the network is in the process of being changed to the future topology, according to some embodiments, the systems and methods may include determining if the network has been run error-free for a certain time (e.g., 2-3 days). When not defined at Layer 2, DCN can be preconfigured. The network may run error-free when data interfaces are unconnected.

In some embodiments, config changes may include changes to amplification power of one or more amplifiers, reconfiguring (enable/disable) ports and/or interfaces, enabling a relay agent of a NE, enables ARC on interfaces, modifying a ROADM of a neighboring NE, modify costs, etc. The enabled interface can then detect topology change in a sequence of steps for transitioning to the future topology. A future realization date and time can be used for applying changes (e.g., switching one or more interfaces to an enabled state). Also, topology changes may include adding/removing a node or photonic node, adding/removing a NE, amp, fibers, etc., changing a fiber or fiber connections, DCN configuration/topology change in central office, site info (site name), etc.

It may be noted that the systems and methods of the present disclosure are able to overcome the deficiencies of the conventional scheme. Real time analysis of discovered topology against future planned topology, as described in the present disclosure, is configured to trigger atomic configuration updates in nodes specific to the topology change which has occurred. Analysis of current and future node configurations can be used, as described herein, to determine the changes required to transition to the future configuration. Also, the present disclosure describes usage of ARC for data interfaces to avoid standing alarms, traps, and/or conditions in systems when the data interface is unconnected. Another point of novelty with respect to conventional systems is that the present system and methods are configured to remove any coordination required between central office staff and field technicians during network reconfigurations, which can be especially useful with increased usage of contract personnel to perform field technician roles. Also, the step of auditing the discovered node configuration against the planned configuration is novel with respect to conventional systems.

In one example, ZTP may be used for bringing up a new device in the network. However, for the existing devices already deployed and operating in the network, the conventional systems are unable to provide automated configuring, but instead relies on manual configuration changes made by the network operator. According to one case, assume that there is a photonic network or photonic line between two sites and an optical fiber line has been changed, which essentially changes the overall optical characteristics of that optical fiber line. In this respect, it may be determined that a new amplifier should preferably be inserted to minimize loss. As a result of this change, configuration updates may need to be done on adjacent network components or even farther out in the network.

A technician will need to be going out in the field, such as, for example, to change the fiber attachments with this new amplifier being inserted. In conjunction with this, there may typically be someone remotely updating the configuration settings on the adjacent NEs. Instead of relying on this manual config change operation, the systems and methods of the present disclosure are configured to automate the updates on those adjacent NEs once it is determined that the network topology has been updated.

The systems and methods may be used, according to some implementations, for deployment in a network, where there is 1) a change in the Layer 0 network, and/or 2) a change in the network at any of Layers 1, 2, or 3. Layer 3, for example, may include switches and routers connected by Ethernet for DCN. For various reasons, communications may be needed between devices at a physical site. Due to the number of ports and interfaces on these devices, as the number of devices at a site grows, physical reconfigurations of those communications may be needed to provide resiliency. The physical reconfiguration may need more than just changing Ethernet cables, but also need updating or changing configurations in the devices, such as for point-to-point Ethernet connections. For example, a site might have 20 switches, and a plan may include the need for adding two more. This results in a need for a change in the configuration settings or parameters. Rather than change everything manually, the present disclosure may include the automated execution of the configuration changes.

In some embodiments, the systems and methods may include aspect of planning a network and then planning the changes to an existing network to reach the planned network. Effectively, this may include looking at a delta between the currently deployed network and my future planned network. When the topology lines up with the future planned network, then the present systems and methods are configured to go and change any associated configuration settings on the nodes in an automated fashion.

The aspect of realization dates and times, a timed deployment strategy can be used. In some embodiments, this may include a ZTP scenario for new devices. In one case that includes cascading NEs, a newly added NE may be installed and then turned up, but its connection into the network may be through another port on an existing (deployed) NE. For ZTP to work in this case, first the port of the existing NE needs to be turned up if it is not already enabled. If the port is already turned up, the present embodiments may include setting up additional configurations for a DHCP element. In this scenario, the network operator may be instructed (e.g., by the network controller 80) to set a time and date when turn-up is to happen automatically. Presumably, it is going to be turned up in advance, as long as it is ready when the new node is installed and turned up.

Another aspect may be a situation where, if a port is turned up and nothing is connected to it, it may be generating some traps or ARC messages in the network controller 80 or other suitable management system. These message might be somewhat spurious since they may occur during a transition time between a current network topology and the planned future topology. ARC messages are defined in some management standards, typically for photonic SONET devices. However, these ARC messages are usually not used for Layer 2 or 3 devices. As a result of the implementation of the present disclosure, the network controller 80 may be configured to turning up an Ethernet port, but then suppressing the reporting of any alarms until after the network has been running error-free for a certain time interval. This allows a data port to be turned up early without seeing negative error messages. Once the technician plugs in the new equipment and finish other related work, the network may be monitored for a certain length of time (e.g., 72 hours) to determine if it is running without any faults or errors. If so, the error messages of the ARC system can be stopped.

The network controller 80 (e.g., NMS) may be configured to push the planning data down to the neighboring devices when it is known what the planned future topology is going to be. Then, the current topology of the network can be used as a trigger. That is, when it is determined that the topology matches the planned topology, the network controller 80 can then update the neighboring nodes.

According to some implementations, a planning/execution strategy may include 1) plan (e.g., a fiber is going to be installed), 2) figure out config changes in adjacent existing NEs (e.g., where these configs are made to be part of the plan), 3) the trigger to detect those changes is when the planned physical changes have been done, and 4) execute the change (i.e., effecting the plan already in place).

In some cases, with the suppressing of the ARC alarms, changes on the adjacent NE be made in advance, especially in embodiments directed to changes in a system where devices are connected via Ethernet. The network controller 80 can pre-configure adjacent Ethernet ports at any time and does not need to wait for the trigger that the physical changes are done. The network controller 80 (e.g., NMS, SDN controller, orchestrator, EMS, etc.) includes planning capabilities and network management capabilities. Normally, in conventional systems, an NMS would not have these capabilities in one system, but the functionality instead would be separates. In some cases, an NMS may be instructed about future plans from a different control device (e.g., network controller 80). Then, the NMS in this case can receive planning information from a different entity, perhaps, or this could be molded into one single device.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method comprising the steps of:
in response to receiving a topology plan to change a network from an initial network topology to a future network topology that includes adding a new Network Element (NE) in the network, determining a configuration plan to change configuration settings of one or more existing NEs deployed in the network in order to transition the network from the initial network topology to the future network topology with the new NE, and
in response to discovering that the network has been physically changed to match the future network topology, automatically enacting the configuration plan to change the configuration settings of a relay agent on the one or more existing NEs, wherein the configuration settings are changed to configure at least one of the one or more existing NEs to communicate with the new NE where the relay agent is configured to communicate with the new NE for provisioning thereof, wherein the relay agent is configured as a DHCP relay agent to facilitate in DHCP message exchanges between the new NE and a DHCP server subsequent to the configuration settings changes.

2. The method of claim 1, further comprising the steps of:
discovering a current network topology of the network,
calculating a delta between the current network topology and the future network topology,
determining whether the current network topology matches the future network topology, and
suppressing one or more alarms or notifications from being provided by an Alarm Reporting Control (ARC) when the current network topology is an intermediate topology between the initial network topology and the future network topology.

3. A non-transitory computer-readable medium configured to store computer logic having instructions that, when executed, enable a processing device to
in response to receiving a topology plan to change a network from an initial network topology to a future network topology that includes adding a new Network Element (NE) in the network, determine a configuration plan to change configuration settings of one or more existing NEs deployed in the network in order to transition the network from the initial network topology to the future network topology with the new NE, and
in response to discovering that the network has been physically changed to match the future network topology, automatically enact the configuration plan to change the configuration settings of the one or more existing NEs, wherein the configuration settings are changed to configure a relay agent on at least one of the one or more existing NEs to communicate with the new NE where the relay agent is configured to communicate with the new NE for provisioning thereof, wherein the relay agent is configured as a DHCP relay agent to facilitate in DHCP message exchanges between the new NE and a DHCP server subsequent to the configuration settings changes.

4. The non-transitory computer-readable medium of claim 3, wherein the future network topology includes one or more new NEs, and wherein the instructions further enable the processing device to determine configuration settings for each of the one or more new NEs.

5. The non-transitory computer-readable medium of claim 4, wherein determining the configuration settings for each of the one or more new NEs includes using Zero Touch Provisioning (ZTP).

6. The non-transitory computer-readable medium of claim 3, wherein the instructions further enable the processing device to:
discover a current network topology of the network,
calculate a delta between the current network topology and the future network topology, and
determine whether the current network topology matches the future network topology.

7. The non-transitory computer-readable medium of claim 6, wherein the instructions further enable the processing device to suppress one or more alarms or notifications from being provided by an Alarm Reporting Control (ARC) when the current network topology is an intermediate topology between the initial network topology and the future network topology.

8. The non-transitory computer-readable medium of claim 6, wherein the instructions further enable the processing device to
determine whether the network runs error-free when in the current network topology, and
suppress the one or more alarms or notifications for a predetermined time period while the network runs error-free.

9. The non-transitory computer-readable medium of claim 6, wherein the instructions further enable the processing device to repeat the discovering and calculating until the current network topology matches the future network topology.

10. The non-transitory computer-readable medium of claim 6, wherein the instructions further enable the processing device to determine configuration updates for changing the configuration settings of the one or more existing NEs in order to convert the network from the current network topology to the future network topology.

11. The non-transitory computer-readable medium of claim 3, wherein the instructions further enable the processing device to
load the determined configuration plan in memory, and
retrieve the configuration plan from the memory for automatically enacting the configuration plan.

12. The non-transitory computer-readable medium of claim 3, wherein, subsequent to automatically enacting the configuration plan, the instructions further enable the processing device to reset the future network topology as the initial network topology.

13. The non-transitory computer-readable medium of claim 3, wherein discovering network topology includes a link layer discovery protocol.

14. The non-transitory computer-readable medium of claim 3, wherein receiving the topology plan includes enabling a user of the processing device to submit the topology plan.

15. The non-transitory computer-readable medium of claim 3, wherein the processing device is incorporated in one or more of a Network Management System (NMS), an Element Management System (EMS), a Software-Defined Networking (SDN) controller, a network orchestrator, and a planning/configuring system.

16. The non-transitory computer-readable medium of claim 1, wherein changing the configuration settings further include one or more network actions selected from the group consisting of: modifying an amplification power of one or more amplifiers, enabling an Alarm Reporting Control (ARC) of one or more ports or interfaces, and modifying a Reconfigurable Optical Add/Drop Multiplexer (ROADM) of one or more NEs.

17. The non-transitory computer-readable medium of claim 16, wherein the one or more network actions include a plurality of network actions enacted in accordance with a predetermined sequence.

18. A network controller comprising:
a processing device, and
a memory device configured to store a computer program having instructions that, when executed, enable the processing device to
in response to receiving a topology plan to change a network from an initial network topology to a future network topology that includes adding a new Network Element (NE) in the network, determine a configuration plan to change configuration settings of one or more existing NEs deployed in the network in order to transition the network from the initial network topology to the future network topology with the new NE, and in response to discovering that the network has been physically changed to match the future network topology, automatically enact the configuration plan to change the configuration settings of the one or more existing NEs, wherein the configuration settings are changed to configure a relay agent on at least one of the one or more existing NEs to communicate with the new NE where the relay agent is configured to communicate with the new NE for provisioning thereof, wherein the relay agent is configured as a DHCP relay agent to facilitate in DHCP message exchanges between the new NE and a DHCP server subsequent to the configuration settings changes.

19. The network controller of claim 18, wherein the future network topology includes one or more new NEs, wherein the instructions further enable the processing device to determine configuration settings for each of the one or more new NEs, and wherein determining the configuration settings for each of the one or more new NEs includes using Zero Touch Provisioning (ZTP).

* * * * *